US011015675B2

(12) United States Patent
Voges

(10) Patent No.: US 11,015,675 B2
(45) Date of Patent: May 25, 2021

(54) ENGINE BALANCER

(71) Applicant: Harley-Davidson Motor Company Group, LLC, Milwaukee, WI (US)

(72) Inventor: Johann Voges, Brookfield, WI (US)

(73) Assignee: Harley-Davidson Motor Company Group, LLC, Milwaukee, WI (US)

( * ) Notice: Subject to any disclaimer, the term of this patent is extended or adjusted under 35 U.S.C. 154(b) by 0 days.

(21) Appl. No.: 16/252,892

(22) Filed: Jan. 21, 2019

(65) Prior Publication Data
US 2020/0232537 A1 Jul. 23, 2020

(51) Int. Cl.
*F16F 15/26* (2006.01)
*F01L 1/344* (2006.01)
*B60W 30/20* (2006.01)
*F16F 15/28* (2006.01)

(52) U.S. Cl.
CPC ............ *F16F 15/26* (2013.01); *B60W 30/20* (2013.01); *F01L 1/344* (2013.01); *F16F 15/262* (2013.01); *F16F 15/283* (2013.01); *B60W 2030/206* (2013.01); *F16F 2222/08* (2013.01); *F16F 2230/0011* (2013.01); *F16F 2232/02* (2013.01)

(58) Field of Classification Search
None
See application file for complete search history.

(56) References Cited

U.S. PATENT DOCUMENTS

| | | | |
|---|---|---|---|
| 3,110,195 A * | 11/1963 | Hanley | F01L 1/02 74/604 |
| 3,415,237 A | 12/1968 | Harkness | |
| 5,230,311 A | 7/1993 | Kuhn et al. | |
| 5,678,516 A * | 10/1997 | Sakurai | F02B 75/20 123/198 R |
| 6,067,950 A | 5/2000 | Kinoshita et al. | |
| 6,164,259 A | 12/2000 | Brogdon et al. | |

(Continued)

FOREIGN PATENT DOCUMENTS

| | | |
|---|---|---|
| DE | 3640502 A1 | 6/1988 |
| DE | 3737296 A1 | 6/1988 |

(Continued)

OTHER PUBLICATIONS

Yamaha Motor Company 1854cc V-twin Engine used in XV1900 "Stratoliner" and 2018 "Venture" models, products on sale or publicly available prior to Jan. 21, 2019, 1 page of representative product images.

(Continued)

*Primary Examiner* — Patrick Hamo
*Assistant Examiner* — Wesley G Harris
(74) *Attorney, Agent, or Firm* — Michael Best & Friedrich LLP

(57) ABSTRACT

An internal combustion engine includes a crankshaft having a first end and a second end opposite the first end. The crankshaft defines a crank axis and is rotatable about the crank axis. The internal combustion engine also includes a camshaft that defines a camshaft axis and is rotatable about the camshaft axis. The internal combustion engine further includes a cam drive assembly that is operable to transfer rotation from the crankshaft to the camshaft, a balance mass rotatable about the crankshaft, and a balancer drive assembly operable to drive the balance mass through the cam drive assembly.

23 Claims, 11 Drawing Sheets

(56) References Cited

U.S. PATENT DOCUMENTS

| | | |
|---|---|---|
| 6,848,411 B2 | 2/2005 | Koyama |
| 7,370,624 B2 | 5/2008 | Messing et al. |
| 7,506,627 B2 | 5/2009 | Nakayama |
| 7,905,210 B2 | 3/2011 | Eto et al. |
| 7,921,825 B2 | 4/2011 | Gauthier |
| 8,127,736 B2 | 3/2012 | Lee et al. |
| 8,667,943 B2 | 3/2014 | Melde-Tuczai et al. |
| 8,720,403 B2 | 5/2014 | Yano et al. |
| 9,103,396 B2 | 8/2015 | Iida et al. |
| 9,528,569 B2 | 12/2016 | Sugiura et al. |
| 9,695,905 B2 | 7/2017 | Sakata |
| 2001/0023676 A1* | 9/2001 | Takano ............... F02B 75/20 123/192.2 |
| 2005/0109305 A1* | 5/2005 | Takeuchi ............ F02B 61/02 123/192.2 |
| 2017/0241510 A1 | 8/2017 | Gregory et al. |

FOREIGN PATENT DOCUMENTS

| | | | |
|---|---|---|---|
| DE | 4319333 A1 | 12/1994 | |
| EP | 1983215 A1 | 10/2008 | |
| EP | 2507492 B1 | 10/2012 | |
| FR | 1535894 A | 8/1968 | |
| GB | 1101580 A1 | 1/1968 | |
| GB | 2099512 A1 | 12/1982 | |
| JP | 60241544 A * | 11/1985 | ............ F16F 15/264 |
| JP | 5908452 B2 | 6/2015 | |

OTHER PUBLICATIONS

Husaberg FE400 Motorcycle Engine, products on sale or publicly available prior to Jan. 21, 2019, 1 page of representative product images.

* cited by examiner

ENGINE BALANCER

BACKGROUND

The present invention relates to engines, and more particularly a balancer for an internal combustion engine.

Internal combustion engines for vehicles generate motive power by the burning of a gasoline, oil, or other fuel mixed with air. The hot gases produced are used to drive pistons that transfer the work to rotate a crankshaft. The rotation of the crankshaft transfers the work to wheels to propel the vehicle forward. In some cases, a camshaft is driven by rotation of the crankshaft to supply the air fuel mixture so the engine can continue to generate the motive power. Due to the moving parts of an internal combustion engine, uneven forces are generated that may negatively impact rotation of the crankshaft, camshaft, or other components. Typically, balancers are used to counteract these forces and maintain smooth operation of the internal combustion engine. For example, a balancer may be used to balance the inertia due to the reciprocating component imbalance from the pistons.

SUMMARY

In one aspect, the invention provides an internal combustion engine including a crankshaft having a first end and a second end opposite the first end. The crankshaft defines a crank axis and is rotatable about the crank axis. The internal combustion engine also includes a camshaft that defines a camshaft axis and is rotatable about the camshaft axis. The internal combustion engine further includes a cam drive assembly that is operable to transfer rotation from the crankshaft to the camshaft, a balance mass rotatable about the crankshaft, and a balancer drive assembly operable to drive the balance mass through the cam drive assembly.

In another aspect, the invention provides an internal combustion engine including a crankshaft having a first end and a second end opposite the first end. The crankshaft defines a crank axis and is rotatable about the crank axis in a first direction. The internal combustion engine also includes a camshaft that defines a camshaft axis and is rotatable about the camshaft axis, a balance mass rotatable about the crankshaft in a second direction opposite the first direction, and a drive member having a first output for driving the camshaft and a second output for driving the balance mass.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

The term "coupled" means connected to or engage with, whether either directly or indirectly, for example with an intervening member, and does not require the engagement to be fixed or permanent, although engagement can be fixed or permanent. It should be understood that the use of numerical terms "first," "second," "third," etc. as used herein does not refer to any particular sequence or order of components; for example, "first" and "second" portions may refer to any sequence of such components, and is not limited to the first and second components of a particular configuration.

Figure 1:
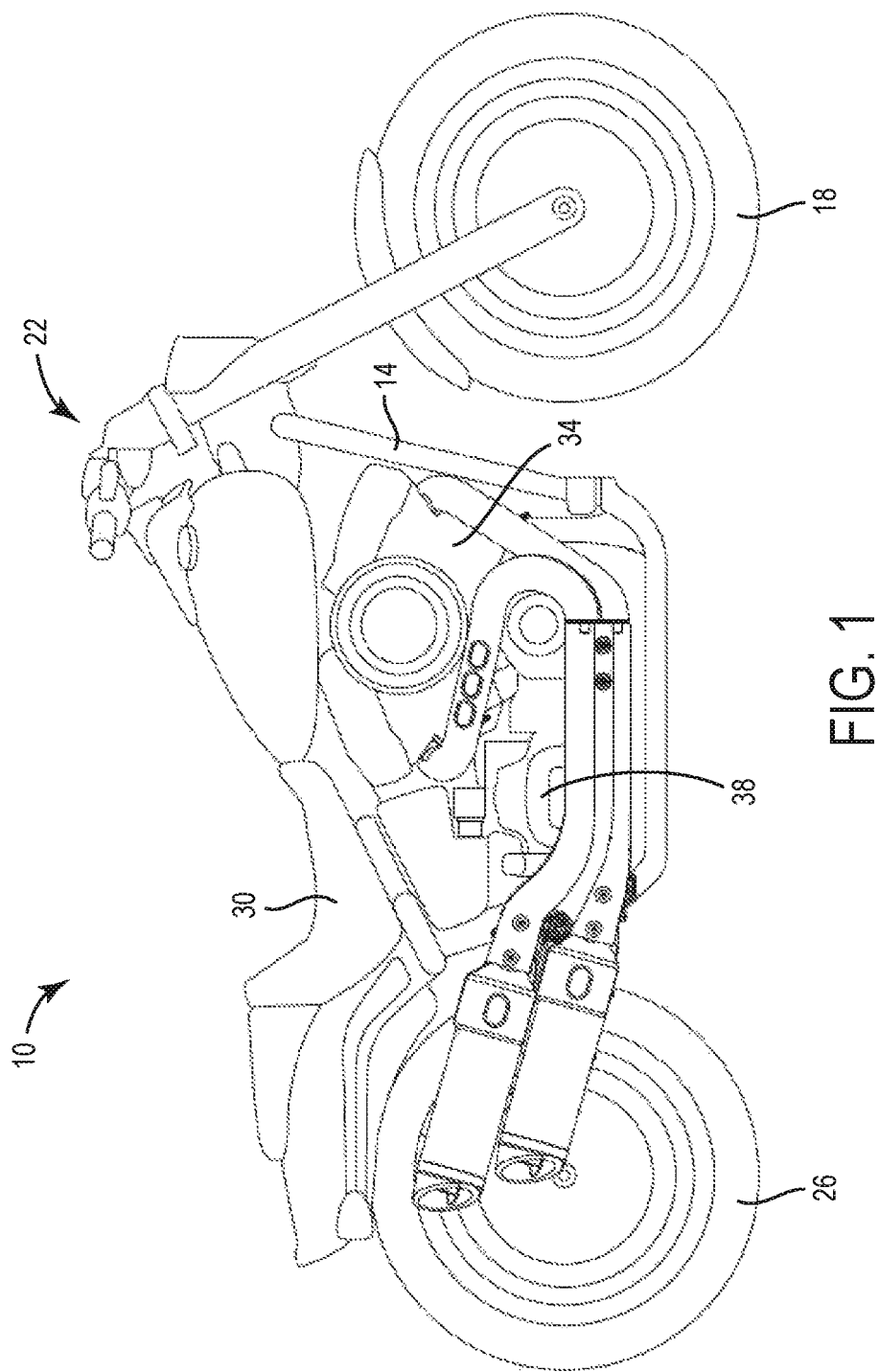
FIG. 1 is a side view of a motorcycle.

FIG. 1 illustrates a motorcycle 10. The illustrated motorcycle 10 includes a frame 14, a front wheel 18 coupled to the frame 14 through a steering assembly 22, a rear wheel 26 coupled to the frame 14 through a swing arm assembly (not shown), and a seat 30 for a rider to be positioned. The motorcycle 10 includes an engine 34 coupled to the frame 14 and operatively coupled to drive the rear wheel 26 through a transmission 38 (e.g., having multiple selectable gear ratios).

Figure 2:
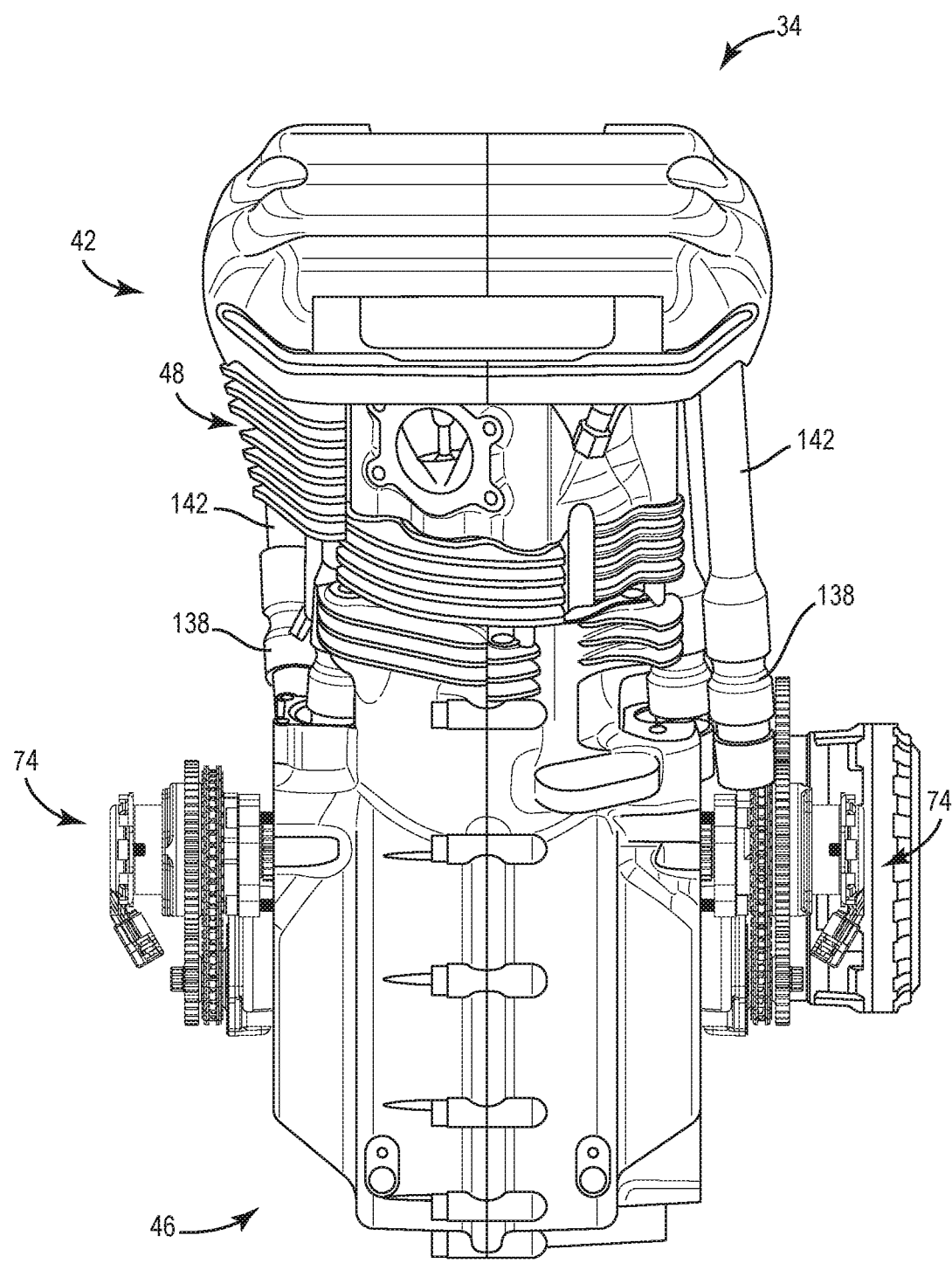
FIG. 2 is a front view of an internal combustion engine of the motorcycle of FIG. 1.

FIG. 2 illustrates the engine 34, an internal combustion engine, for use on the motorcycle 10 of FIG. 1. The engine 34 includes a cylinder block 42 and a crankcase 46. Although not illustrated, pistons are positioned within respective cylinders of the block 42. In the illustrated embodiment, the engine is a V-twin engine including two cylinders arranged in a "V" (e.g., defining an angle of 45 degrees or 60 degrees therebetween). In response to combustion within combustion chambers of a cylinder head 48, the pistons reciprocate within the cylinders to rotate a crankshaft 50 (FIG. 4).

The operation of the engine 34 discussed above produces uneven forces or imbalances within the engine 34. Although there are more imbalances created, two major imbalances are reciprocating imbalance due to the up/down motion of the pistons and rotation imbalance due to the rotation of the crankshaft 50. As such, the engine 34 includes balancers to counteract the uneven forces.

Figure 4:
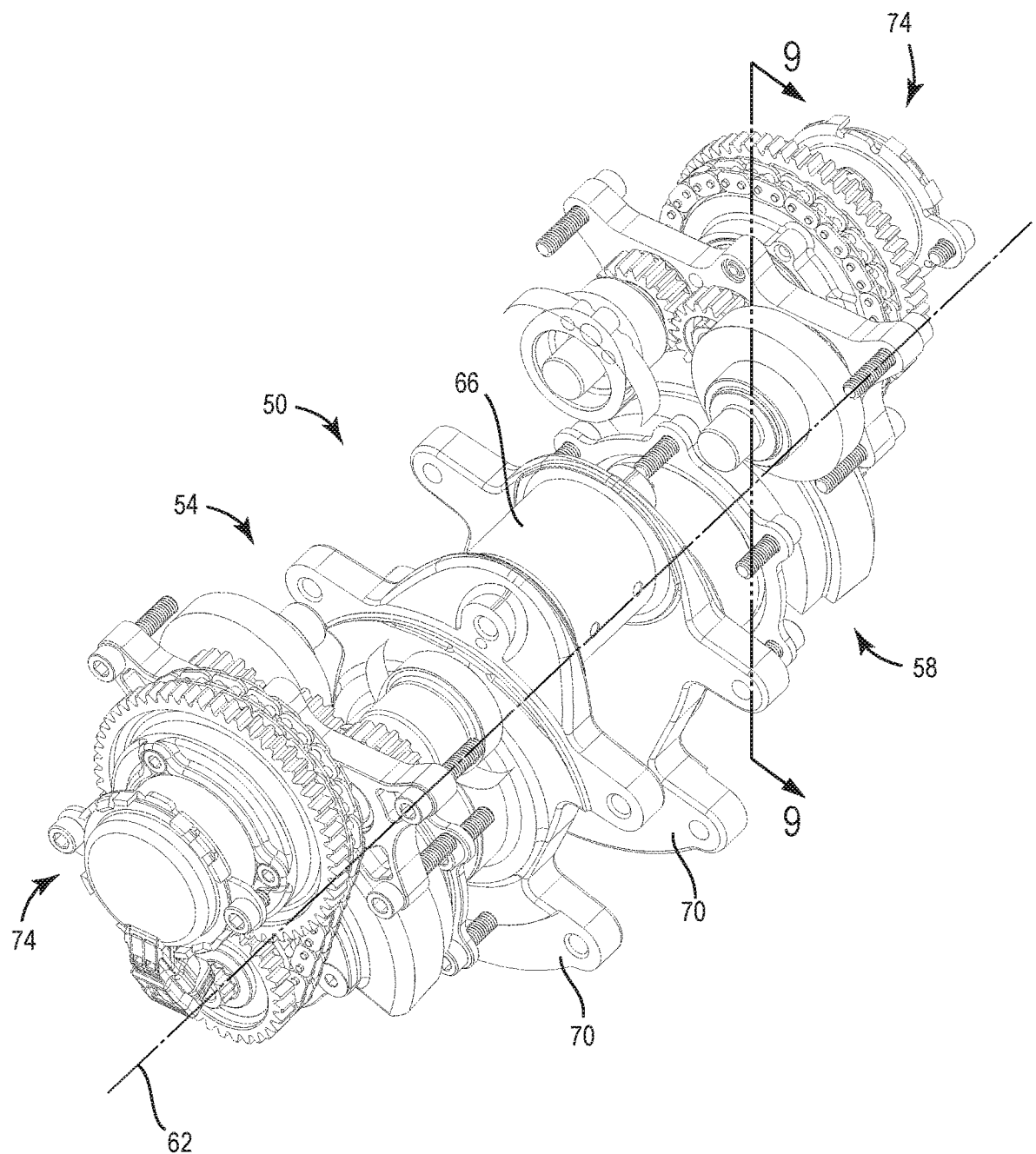
FIG. 4 is a perspective view of a portion of the internal combustion engine of FIG. 2.

With reference to FIG. 4, the crankshaft 50 is positioned within the crankcase 46 (FIG. 2). The crankshaft 50 includes a first end 54, a second end 58 opposite the first end 54, and a crank axis 62 that extends centrally through the crankshaft 50 between the first and second ends 54, 58. The crankshaft 50 is rotatable about the crank axis 62 within the crankcase 46. The crankshaft 50 further includes a crankpin 66 and two counter balance weights 70. Connecting rods (not shown) couple the pistons to the crankpin 66 to transfer the linear movement of the pistons to the rotational movement of the crankshaft 50. The counter balance weights 70 counteract the rotation imbalance caused by the rotation of the crankshaft 50.

With continued reference to FIG. 4, a first balancer module 74 is coupled to the first end 54 of the crankshaft 50 and a second balancer module 74 is coupled to the second end 58 of the crankshaft 50. In the illustrated embodiments, there are two balancer modules 74, although in other embodiments, one balancer module 74 may be used or more than two balancer modules 74 may be used.

Figure 3:
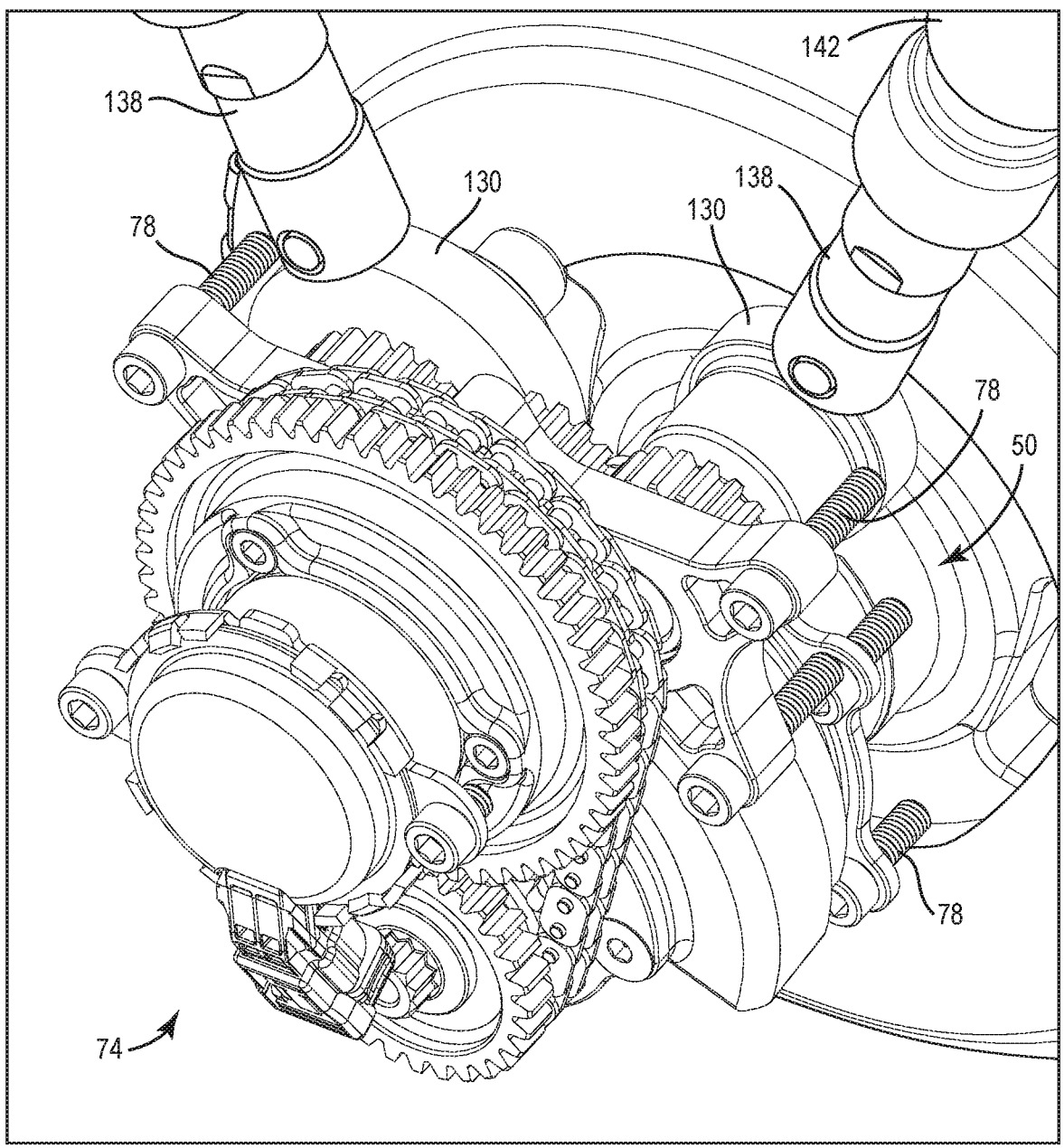
FIG. 3 is a partial perspective view of the internal combustion engine of FIG. 2.

As shown in FIGS. 2 and 3, each of the balancer modules 74 is selectively coupled to the crankcase 46 as a subassembly. In other words, the balancer modules 74 are separately and completely removable from the crankcase 46 and the crankshaft 50. In the illustrated embodiment, the balancer modules 74 are coupled to the crankcase 46 with a plurality of fasteners 78 (FIG. 3). The fasteners 78 may be loosened to remove the balancer modules 74 from the crankcase 46 to replace or perform maintenance on the balancer modules 74.

FIGS. 5-8 illustrate one of the balancer modules 74. Other balancer modules 74 are similar to the one described below. The balancer module 74 includes a frame 82, a balance mass 86, two camshafts 90, a drive assembly 94, and a variable valve timing unit 98. The frame 82 supports the balance mass 86, the camshafts 90, the drive assembly 94, and the variable valve timing unit 98. The frame 82 includes an upper portion 102, a lower portion 106, and a plurality of apertures 110 that the fasteners 78 extend through to couple the balancer module 74 to the crankcase 46. In the illustrated embodiment, the upper portion 102 and the lower portion 106 of the frame 82 are formed as two separate components, although in other embodiments, the lower and upper portions 102, 106 may be combined to form a single component. The lower portion 106 of the frame includes a hub 114 for coupling the balancer module 74 to one of the ends 54, 58 of the crankshaft 50.

Figure 9:
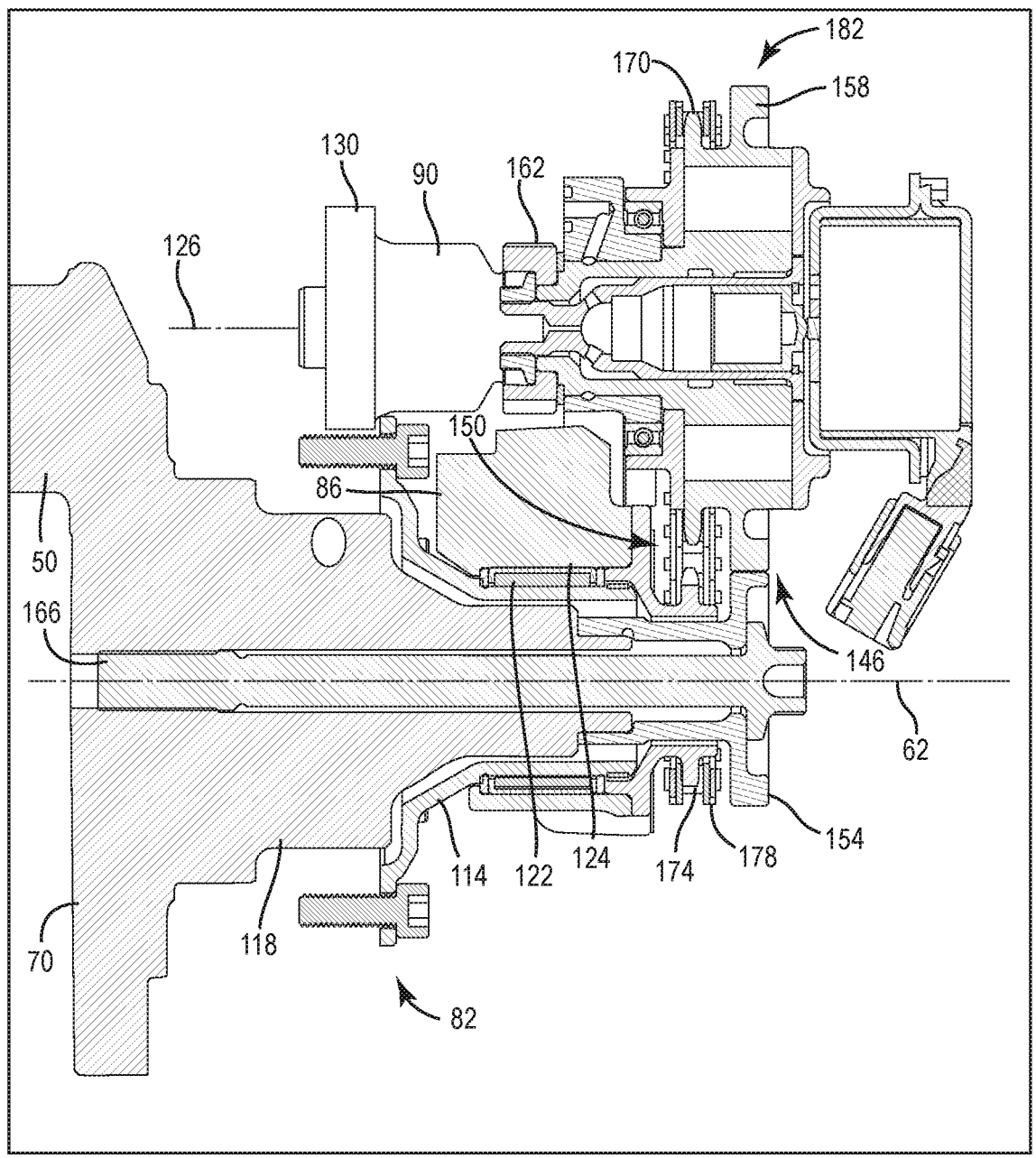
FIG. 9 is a cross-sectional view of the balancer module taken along lines 9-9 of FIG. 4.
Figure 10:
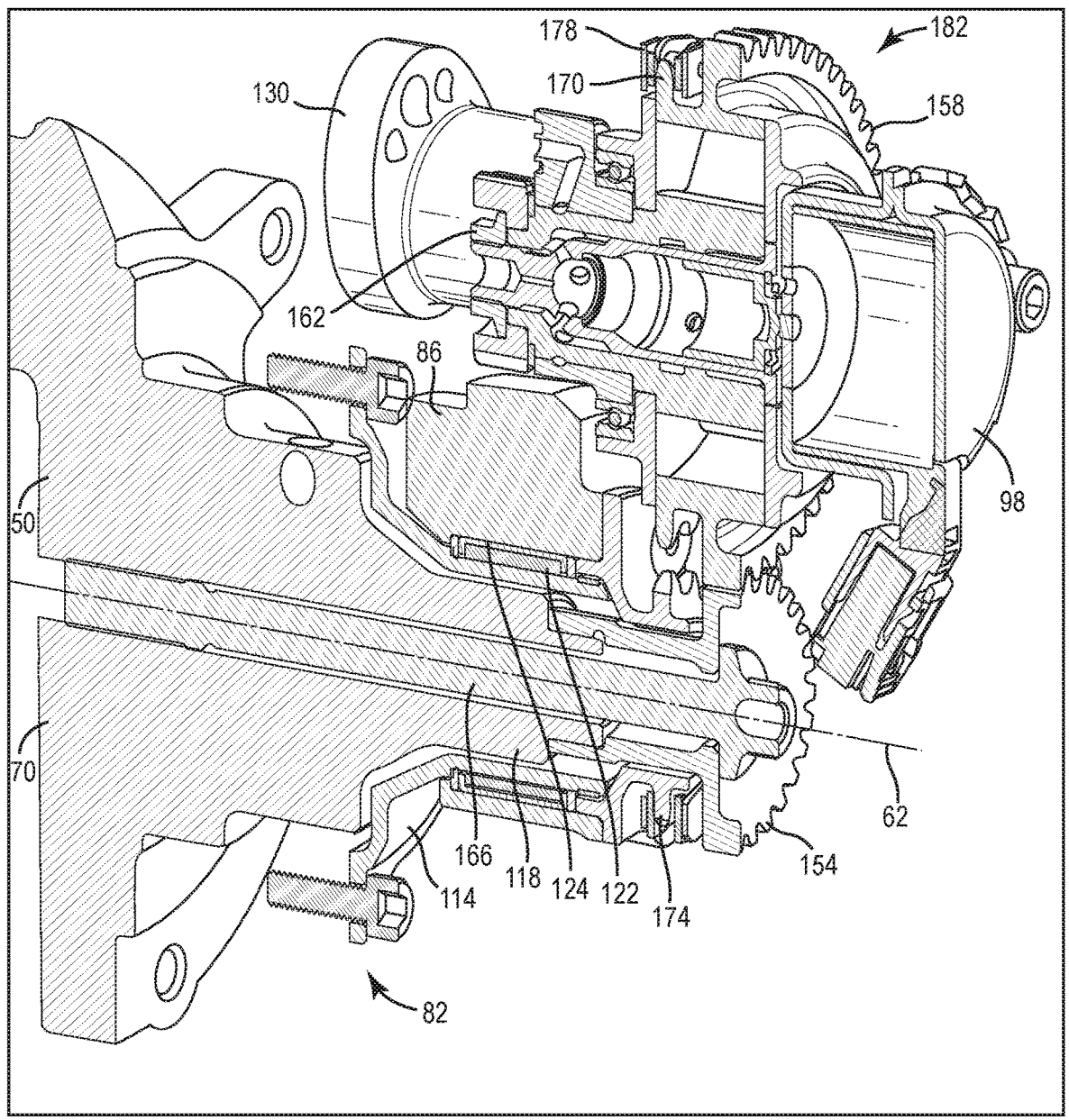
FIG. 10 is a perspective view of the balancer module of FIG. 9.
Figure 11:
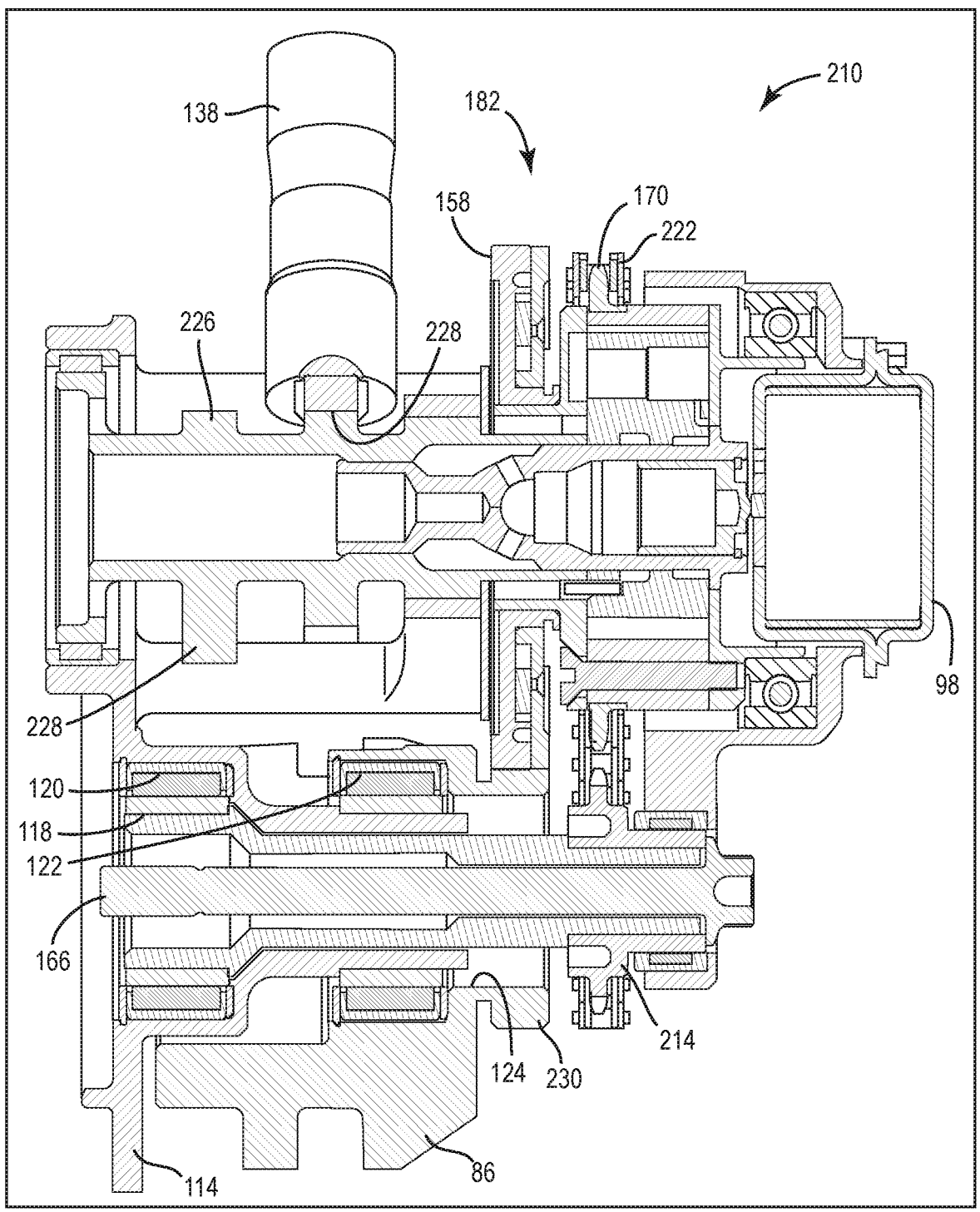
FIG. 11 is a cross-sectional view of a drive assembly according to another embodiment of the invention.

As shown in FIGS. 9 and 10, the crankshaft 50 includes a crank snout 118 that extends into the hub 114 of the frame 82. In the illustrated embodiment, the crank snout 118 is an integral part of the crankshaft 50, along with the counter balance weights 70. In other embodiments, one of which is illustrated in FIG. 11, the crank snout 118 may be separately formed and fastened securely to form part of the crankshaft 50. The crank snout 118 rotates freely within the hub 114. As shown in FIG. 9, the hub 114 is spaced radially outward of the crankshaft 50, particularly the crank snout 118, such that the hub 114 does not support the crankshaft 50. Although not shown, a main bearing positioned in the crankcase 46 supports the crankshaft 50 for rotation within the crankcase 46. In other embodiments, one of which is illustrated in FIG. 11, a bearing 120 supports the crank snout 118 for rotation within the hub 114 of the frame 82.

With continued reference to FIGS. 9 and 10, the balance mass 86 is supported for rotation on the hub 114 with a bearing 122. The hub 114 extends through a bore 124 of the balance mass 86. The bore 124 defines an axis of rotation about which the balance mass 86 is rotatable. Since the crank snout 118 extends into the hub 114, the crankshaft 50 also extends into the bore 124 of the balance mass 86 and at least partially through the balance mass 86. Therefore, the balance mass 86 is rotatable about the crankshaft 50. In the illustrated embodiment, the axis of rotation of the balance mass 86 is concentric with the crank axis 62. However, in some embodiments, the axis of rotation of the balance mass 86 is offset from the crank axis 62. For example, the axis of rotation of the balance mass 86 may be offset from the crank axis 62 by a distance of 15 mm or less. The range of offset distance between the axis of rotation of the balance mass 86 and the crank axis 62 may be defined as 5 mm to 12 mm, or alternately 7 mm to 10 mm. The mass of the balance mass 86 is unevenly distributed about the crank axis 62 to create uneven rotation forces. Rotation of the balance mass 86 counteracts the reciprocating imbalance due to the up/down motion of the pistons. In the illustrated embodiment, the balance mass 86 is a first order balancer. In other words, the balance mass 86 rotates at the same speed as the crankshaft 50 but in the opposite direction to counteract the reciprocating imbalance. In other embodiments, the balance mass 86 may be a higher order balancer than a first order, such as, for example, a second order balancer.

Figure 6:
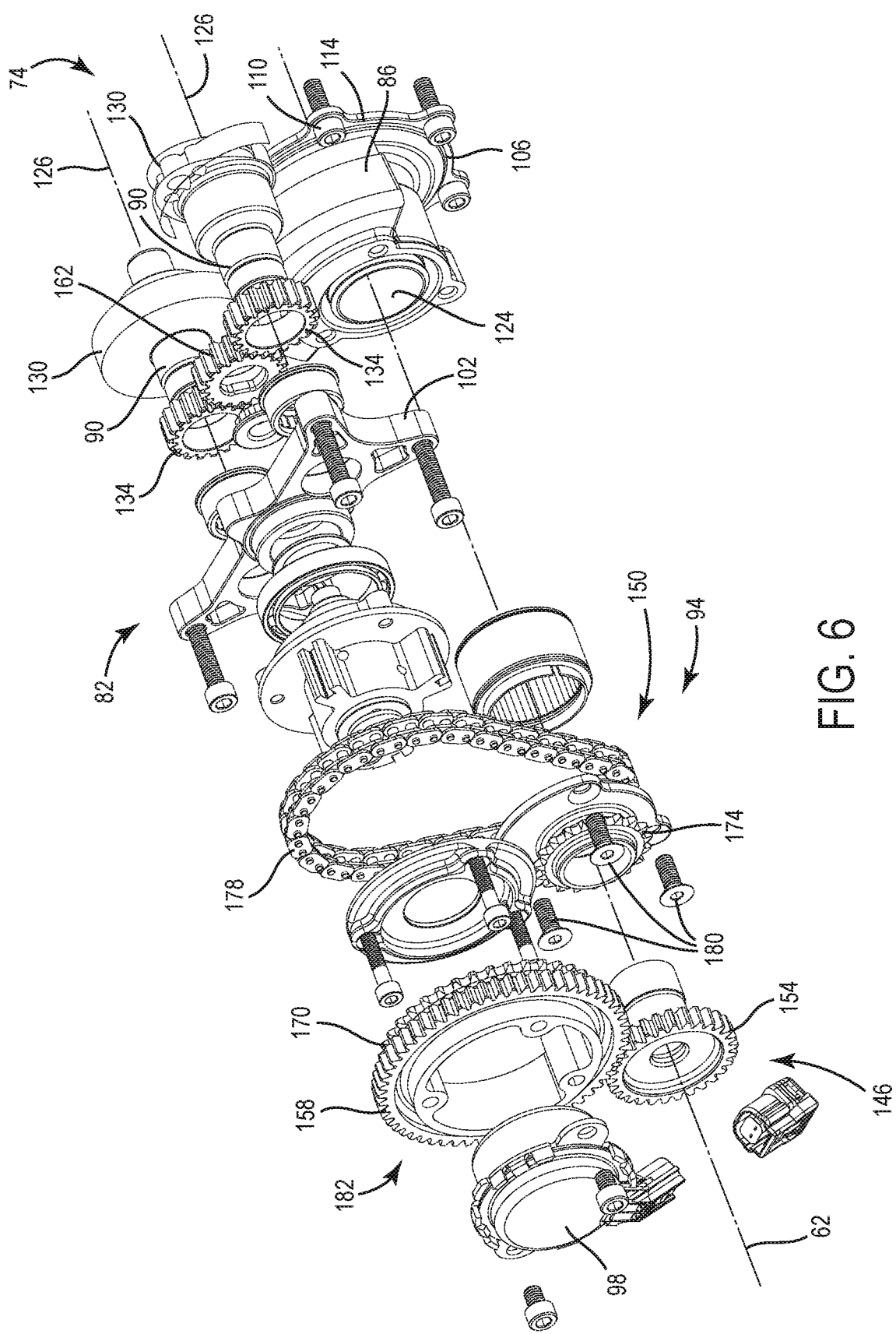
FIG. 6 is an exploded view of the balancer module of FIG. 5.
Figure 8:
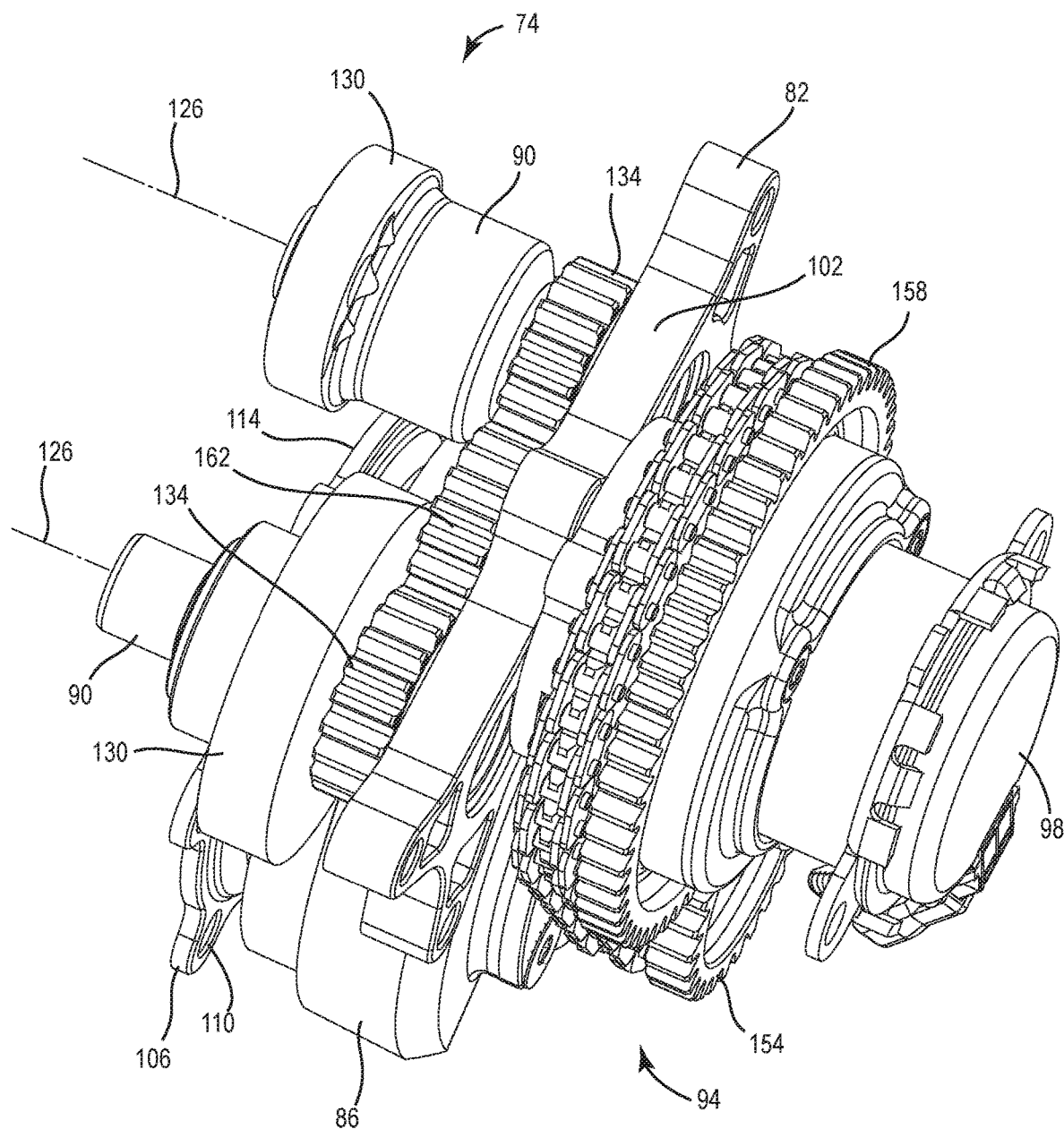
FIG. 8 is a second perspective view of the balancer module of FIG. 5

As shown in FIGS. 6 and 8, the camshafts 90 are supported by the upper portion 102 of the frame 82. Each camshaft 90 defines a camshaft axis 126. The camshafts 90 are rotatable relative to the frame 82 about their respective camshaft axis 126. In the illustrated embodiment, the balancer module 74 includes two camshafts 90. In other embodiments, the balancer module 74 may only include one camshaft 90 and one camshaft axis 126. In further embodiments, the balancer module 74 may include more than two camshafts 90 and camshaft axes 126. In the illustrated embodiment, each camshaft 90 includes at least one eccentric cam lobe 130 (e.g., at one end) and a toothed wheel (e.g., a gear 134 at an opposite end). In embodiments with a single camshaft (e.g., FIG. 11 below), the cam shaft includes two or more cam lobes 130 and does not require the gear 134. Rotation of the camshaft 90 rotates the cam lobe 130 causing the cam lobe 130 to contact lifters 138 (FIG. 2). The lifters 138 are displaced linearly by the cam lobes 130. The lifters 138 transfer the linear movement to pushrods 142 that force valves in the cylinder head 48 to open and close.

Figure 5:
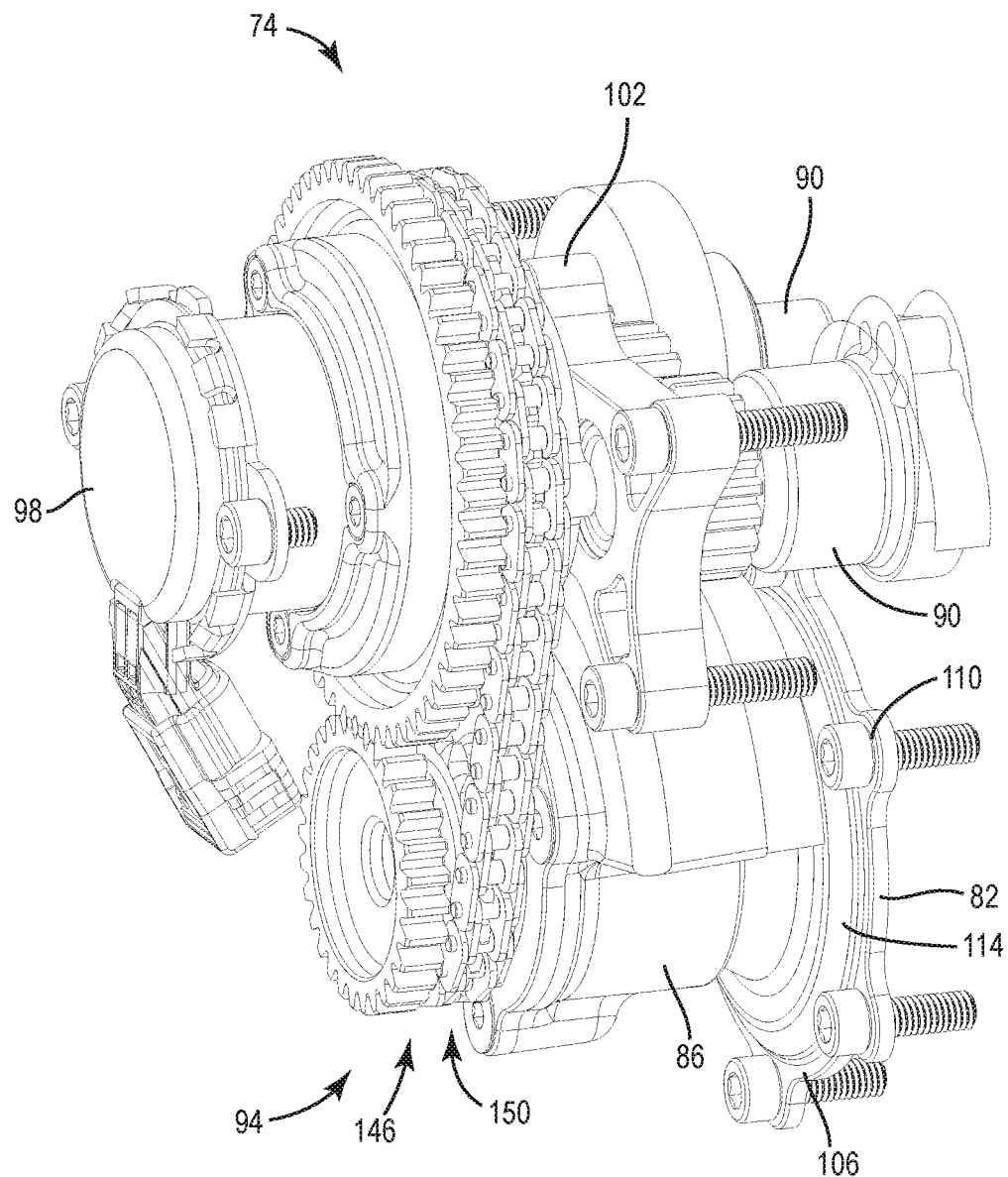
FIG. 5 is a first perspective view of a balancer module of the internal combustion engine of FIG. 4.
Figure 7:
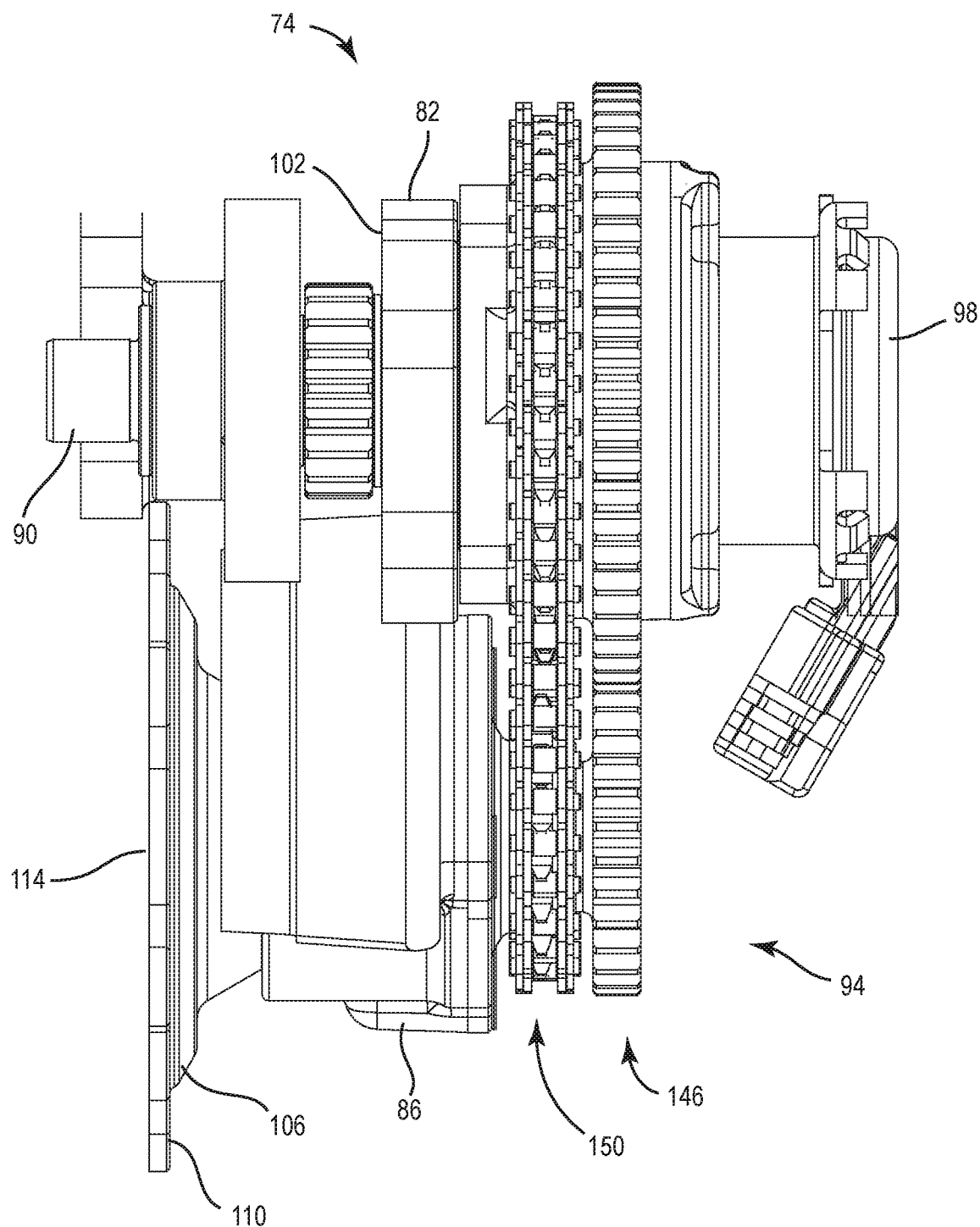
FIG. 7 is a side view of the balancer module of FIG. 5.

With reference to FIGS. 5 and 7, the drive assembly 94 includes a cam drive assembly 146 and a balancer drive assembly 150. Although the drive assembly 94 is described below including two separate subassemblies, the drive assembly 94 may include more than two subassemblies. Further, the drive assembly 94 may include subassemblies that share features with other subassemblies.

Now moving to FIGS. 6 and 9, the cam drive assembly 146 includes a first toothed wheel (i.e., a crank gear 154), a second toothed wheel (i.e., a cam gear 158), and a camshaft drive wheel 162 (e.g., a gear). The crank gear 154 is concentric with the crank axis 62 and extends into the hub 114 from an opposite end as the crank snout 118. The crankshaft 50 further includes a crank bolt 166 (FIG. 9) that extends through the crank gear 154 and the crank snout 118 to couple the crank gear 154 to the crankshaft 50 for co-rotation therewith. A key and keyway may be used to ensure the crank gear 154 is timed with the crankshaft 50. The cam gear 158 is meshed with the crank gear 154 so as to be driven by rotation of the crank gear 154. In the illustrated embodiment, the cam gear 158 includes twice as many gear teeth as the crank gear 154 and therefore rotates at half the speed as the crank gear 154 and the crankshaft 50 (i.e., half crank speed). The camshaft drive wheel 162 is concentric with the cam gear 158 and rotates synchronously with the cam gear 158, having a common speed and direction. In other words, the cam gear 158 and the camshaft drive wheel 162 are linked for rotation together, notwithstanding the ability of the variable valve timing unit 98 to adjust timing of the camshaft drive wheel 162 relative to the cam gear 158.

Now referencing FIG. 8, the camshaft drive wheel 162 is meshed with the gears 134 of the camshafts 90. Due to the gear-to-gear interface between the camshaft drive wheel 162 and the gears 134 of the camshafts 90, the camshafts 90 are rotated in a direction opposite to the camshaft drive wheel

162, such that the camshafts 90 rotate in the same direction as the crankshaft 50. The camshaft drive wheel 162 also includes the same number of teeth as each of the gears 134 of the camshafts 90 such that the camshafts 90 rotate at the same speed as the camshaft drive wheel 162.

With reference back to FIGS. 6 and 9, the balancer drive assembly 150 includes a third toothed wheel (e.g., a cam sprocket 170), a fourth toothed wheel (e.g., a balancer sprocket 174), and a chain 178. The cam sprocket 170 is concentric with the cam gear 158. Further, the cam sprocket 170 is fixedly secured to the cam gear 158 to be integrally rotatable. As such, the cam sprocket 170 rotates at the same speed and in the same direction as the cam gear 158, which is half crank speed. The balancer sprocket 174 is concentric with the balance mass 86 and rotates therewith, whether concentric or eccentric relative to the crank axis 62. The balancer sprocket 174 is also integrally rotatable with the balance mass 86 to rotate at the same speed and in the same direction as the balance mass 86. In the illustrated embodiment, the balancer sprocket 174 is coupled to the balance mass 86 using fasteners (e.g., bolts 180 (FIG. 6)). In other embodiments, the balancer sprocket 174 and the balance mass 86 may be integral. In further embodiments, the balancer sprocket 174 may be pressed on the balance mass 86 as a separate component.

The chain 178 couples the cam sprocket 170 and the balancer sprocket 174 for co-rotation. In other words, the chain 178 provides a connection between the cam sprocket 170 and the balancer sprocket 174 to maintain a fixed speed relationship between the cam sprocket 170 and the balancer sprocket 174 as both rotate in the same direction. The cam sprocket 170 has twice as many teeth as the balancer sprocket 174. As a result, the balancer sprocket 174 is rotated at twice the speed of the cam sprocket 170, which is crank speed. In some embodiments, the balancer drive assembly includes a chain tensioner to tighten the chain if the chain 178 becomes loose.

In the illustrated embodiment, the cam sprocket 170 is integral with the cam gear 158. In other embodiments, the cam sprocket 170 and cam gear 158 may be separate components. Together, the cam gear 158 and the cam sprocket 170 define a drive member 182. The drive member 182 defines two outputs of the drive assembly 94: a first output to drive the camshafts 90 (i.e., via the cam gear 158) and a second output to drive the balance mass 86 (i.e., via the cam sprocket 170). The drive member 182 drives the camshafts 90 at a reduced speed relative to the crankshaft 50 and drives the balance mass 86 at an increased speed relative to the camshafts 90. In other words, the cam drive assembly 146 is a down-speed device that drives the camshafts 90 at a reduced speed relative to the crankshaft 50 and the balancer drive assembly 150 is an up-speed device that drives the balance mass 86 at an increased speed relative to the camshafts 90.

It should be noted that the term "toothed wheel" may refer to any wheel that transfers rotation to another component through a chain, another toothed wheel in a gear-to-gear interface, a toothed belt, or the like. As such, toothed wheel may refer to either a sprocket or a gear. Further, sets of gears and sets of sprockets may be interchanged on the balancer module 74, for example as described below in reference to FIG. 11. However, the balancer module 74 is not limited to the arrangement of components and toothed wheels shown in the illustrated embodiments discussed herein and other arrangements of components and toothed wheels not discussed herein may still be within the scope of the invention. For example, both the cam drive assembly 146 and the balancer drive assembly 150 may all include gears. In this embodiment, either the cam drive assembly 146 or the balancer drive assembly 150 would include a fifth toothed wheel to create counter rotation of the balance mass 86 relative to the crankshaft 50.

The variable valve timing unit 98 is supported by the drive member 182. The variable valve timing unit 98 is operable to adjust the phasing of the camshafts 90 relative to the crankshaft 50. Particularly, the variable valve timing unit 98 phases the rotation of the camshaft drive wheel 162 relative to the drive member 182. In the illustrated embodiment, the variable valve timing unit 98 is a hydraulic phaser. In other embodiments, the variable valve timing unit 98 may be an electronic phaser. In other embodiments, the variable valve timing unit 98 may be omitted from the balancer module 74.

During operation of the engine 34, the linear movement of the pistons is transferred to rotational movement of the crankshaft 50. The crankshaft 50 rotates about the crank axis 62 at a first speed or crank speed. Due to the crank gear 154 being coupled integrally rotatable with the crank snout 118, the crank gear 154 also rotates at crank speed. The crank gear 154 drives the cam gear 158 at a second speed or half crank speed due to the cam gear 158 having twice as many teeth as the crank gear 154. In addition, due to a direct gear-to-gear interface between the cam gear 158 and the crank gear 154, the cam gear 158 is rotated in a direction opposite the direction of rotation of the crankshaft 50. Due to the cam gear 158 and cam sprocket 170 being integrally rotatable, the cam sprocket 170 is driven at half crank speed and in a direction opposite to the direction of rotation of the crankshaft 50.

The cam gear 158 or the first output of the drive member 182 drives the camshaft drive wheel 162 directly to rotate at half crank speed and in a direction opposite to the direction of rotation of the crankshaft 50. Due to the gear-to-gear interface between the camshaft drive wheel 162 and the gears 134 of the camshafts 90, the camshafts 90 are rotated in an opposite direction as the camshaft drive wheel 162. As such, the camshafts 90 are rotated at half crank speed and in the same direction as the crankshaft 50. Rotation of the camshafts 90 rotate the cam lobes 130. The cam lobes 130 contact the lifters 138 and transfer linear movement to the pushrods 142 to open the valves.

Meanwhile, the cam sprocket 170 or the second output of the drive member 182 drives the balancer sprocket 174 through the chain 178. Due to the balancer sprocket 174 having half as many teeth as the cam sprocket 170, the balancer sprocket 174 rotates at twice the speed (i.e., crank speed) as the cam sprocket 170. In addition, due to the chain 178, the cam sprocket 170 and balancer sprocket 174 rotate in the same direction, which is a direction opposite to the direction of rotation of the crankshaft 50. Since the balancer sprocket 174 is integrally rotatable with the balance mass 86, the balance mass 86 is also driven at crank speed, but in the opposite direction as the crankshaft 50. The balance mass 86 rotating in the opposite direction as the crankshaft 50 counteracts the uneven forces introduced by the reciprocating motion of the pistons.

The balance mass 86 forms a first order balancer that rotates about a crankshaft 50 and is driven through a drive assembly 94 that also drives a camshaft 90. This allows the balancer module 74 to be built as a compact unit that is removably coupled to an engine 34. Being able to removably couple the balancer module 74 allows the balancer module 74 to be built and timed (e.g., cam timing and balancer timing relative to crank timing) prior to being installed on the crankcase 46 to save assembly time. Additional parts can also be added to the balancer module 74 before installation such as chain tensioners, anti-backlash gears, etc. Using a cam drive assembly 146 including gear-to-gear interfaces allows for the accurate transfer of rotation from a crankshaft 50 to a camshaft 90. Further, using a drive member 92 that includes two outputs allows the balance mass 86 to be driven by a cam drive assembly 146, without a separate independent drive mechanism off of the crankshaft 50.

FIG. 11 illustrates a balancer module 210 according to another embodiment of the invention. The balancer module 210 is similar to the balancer module 74 but includes a gear-to-gear-interface to transfer rotation from the drive member 182 to the balance mass 86 and a chain and sprockets to transfer rotation from the crankshaft 50 to the drive member 182. As such, like features will be represented with like reference numerals. Particularly, the balancer module 210 includes a crank sprocket 214 that is coupled to the crank snout 118 with the crank bolt 166 for co-rotation with the crankshaft 50. The cam sprocket 170 of the drive member 182 is coupled to the crank sprocket 214 with a chain 222. The drive member 182 is coupled to a camshaft 226 to drive the camshaft 226 in the same direction as the crankshaft 50. The camshaft 226 includes two cam lobes 228 to contact the lifters 138. In other embodiments, the camshaft 226 may include a single cam 228 lobe or more than two cam lobes 228. In this embodiment, a gear (e.g., the gear 134 of camshaft 130) is not required on the camshaft 226 since the camshaft 226 is driven by the drive member 182. The cam gear 158 of the drive member 182 is meshed with a balancer gear 230 that is integrally rotatable with the balance mass 86. The balancer module 210 further includes the variable valve timing unit 98, although in some embodiments, the variable valve timing unit 98 may be omitted from the balancer module 210.

During operation of an engine having the balancer module 210, the crank sprocket 214 rotates with the crankshaft 50. The chain 222 transfers rotation from the crank sprocket 214 to the cam sprocket 170 of the drive member 182. Due to the chain 222, the drive member 182 is rotated in the same direction as the crankshaft 50. Therefore, the drive member 182 drives the camshaft 226 in the same direction as the crankshaft 50. Simultaneously, the cam gear 158 drives the balancer gear 230. Due to the gear-to-gear interface between the cam gear 158 and the balancer gear 230, the balancer gear 230 and thus the balance mass 86 is rotated in a direction that is opposite to the direction of rotation of the crankshaft 50.

Various features and advantages of the invention are set forth in the following claims.

What is claimed is:

1. An internal combustion engine comprising:
a crankshaft including a first end and a second end opposite the first end, the crankshaft defining a crank axis, the crankshaft rotatable about the crank axis;
a camshaft defining a camshaft axis, the camshaft rotatable about the camshaft axis;
a cam drive assembly operable to transfer rotation from a first end of the crankshaft to the camshaft;
a balance mass rotatable around the crank axis at the first end of the crankshaft; and
a balancer drive assembly operable to drive the balance mass through the cam drive assembly.

2. The internal combustion engine of claim 1, wherein the cam drive assembly includes a first toothed wheel that is rotatable with the crankshaft about the crank axis, and a second toothed wheel driven by the first toothed wheel.

3. The internal combustion engine of claim 2, wherein the balancer drive assembly includes a third toothed wheel concentric with the second toothed wheel, and a fourth toothed wheel driven by the third toothed wheel and concentric with the balance mass.

4. The internal combustion engine of claim 3, wherein the third toothed wheel is integrally rotatable with the second toothed wheel.

5. The internal combustion engine of claim 4, wherein the fourth toothed wheel is integrally rotatable with the balance mass in an opposite direction of rotation as the crankshaft.

6. The internal combustion engine of claim 2, wherein the cam drive assembly further includes a camshaft drive wheel that is rotatable with the second toothed wheel to drive the camshaft.

7. The internal combustion engine of claim 1, wherein the camshaft, the cam drive assembly, the balance mass, and the balancer drive assembly are supported by a frame, and wherein the camshaft, the cam drive assembly, the balance mass, the balancer drive assembly, and the frame define a balancer module.

8. The internal combustion engine of claim 7, wherein the balancer module is removably coupled to the first end of the crankshaft and wherein the balancer module is a first balancer module and the internal combustion engine includes a second balancer module coupled to the second end of the crankshaft, the second balancer module including a camshaft, a cam drive assembly, a balance mass, and a balancer drive assembly.

9. The internal combustion engine of claim 7, wherein the balancer module further includes a variable valve timing unit operable to adjust rotation phasing of the camshaft relative to the crankshaft.

10. The internal combustion engine of claim 1, wherein the cam drive assembly is a down-speed device that drives the camshaft at a reduced speed relative to the crankshaft, and the balancer drive assembly is an up-speed device that drives the balance mass at an increased speed relative to the camshaft.

11. The internal combustion engine of claim 1, wherein the balance mass is rotatably supported on the first end of the crankshaft such that the balance mass and the crankshaft rotate concentrically, in opposite directions, with a shared center of rotation at the crank axis.

12. The internal combustion engine of claim 1, wherein the camshaft is a first camshaft and the internal combustion engine further comprises a second camshaft driven by the cam drive assembly.

13. An internal combustion engine comprising:
a crankshaft including a first end and a second end opposite the first end, the crankshaft defining a crank axis, the crankshaft rotatable about the crank axis in a first direction;
a camshaft defining a camshaft axis, the camshaft rotatable about the camshaft axis;
a balance mass rotatable around the crank axis in a second direction opposite the first direction; and
a drive member separated from the crankshaft and coupled to take power off the crankshaft, the drive member having a first output for driving the camshaft and a second output for driving the balance mass.

14. The internal combustion engine of claim 13, wherein the drive member includes two separately formed toothed wheels fixedly secured to be integrally rotatable.

15. The internal combustion engine of claim 13, further comprising a camshaft drive wheel to receive the first output from the drive member to drive the camshaft, and a toothed wheel that receives the second output from the drive member to integrally rotate with the balance mass.

16. The internal combustion engine of claim 13, wherein the drive member drives the cam shaft at a reduced speed relative to the crankshaft, and drives the balance mass at an increased speed relative to the camshaft.

17. The internal combustion engine of claim 13, further comprising a first toothed wheel rotatable with the crankshaft about the crank axis to drive the drive member and a second toothed wheel that receives the second output from the drive member to drive the balance mass.

18. The internal combustion engine of claim 17, wherein the second toothed wheel is integrally rotatable with the balance mass.

19. The internal combustion engine of claim 13, further comprising a camshaft drive wheel that receives the first output from the drive member to drive the camshaft.

20. The internal combustion engine of claim 19, wherein the camshaft is a first camshaft and the internal combustion engine further comprises a second camshaft driven by the camshaft drive wheel.

21. The internal combustion engine of claim 13, wherein the camshaft, the balance mass, and the drive member are supported by a frame, and wherein the camshaft, the balance mass, the drive member, and the frame define a balancer module that is removably coupled to one of the ends of the crankshaft.

22. The internal combustion engine of claim 13, wherein the balance mass is rotatably supported on the crankshaft such that the balance mass and the crankshaft rotate concentrically with a shared center of rotation at the crank axis.

23. An internal combustion engine comprising:
a crankshaft including a first end and a second end opposite the first end, the crankshaft defining a crank axis, the crankshaft rotatable about the crank axis;
a camshaft defining a camshaft axis, the camshaft rotatable about the camshaft axis;
a cam drive assembly operable to transfer rotation from the crankshaft to the camshaft;
a balance mass rotatable around the crank axis; and
a balancer drive assembly operable to drive the balance mass,
wherein a rotatable drive member distanced from the crank axis forms part of a power transmission path from the crankshaft to the balance mass and forms part of a power transmission path from the crankshaft to the camshaft such that the drive member forms an integral part of both the balancer drive assembly and the cam drive assembly.

* * * * *